UNITED STATES PATENT OFFICE.

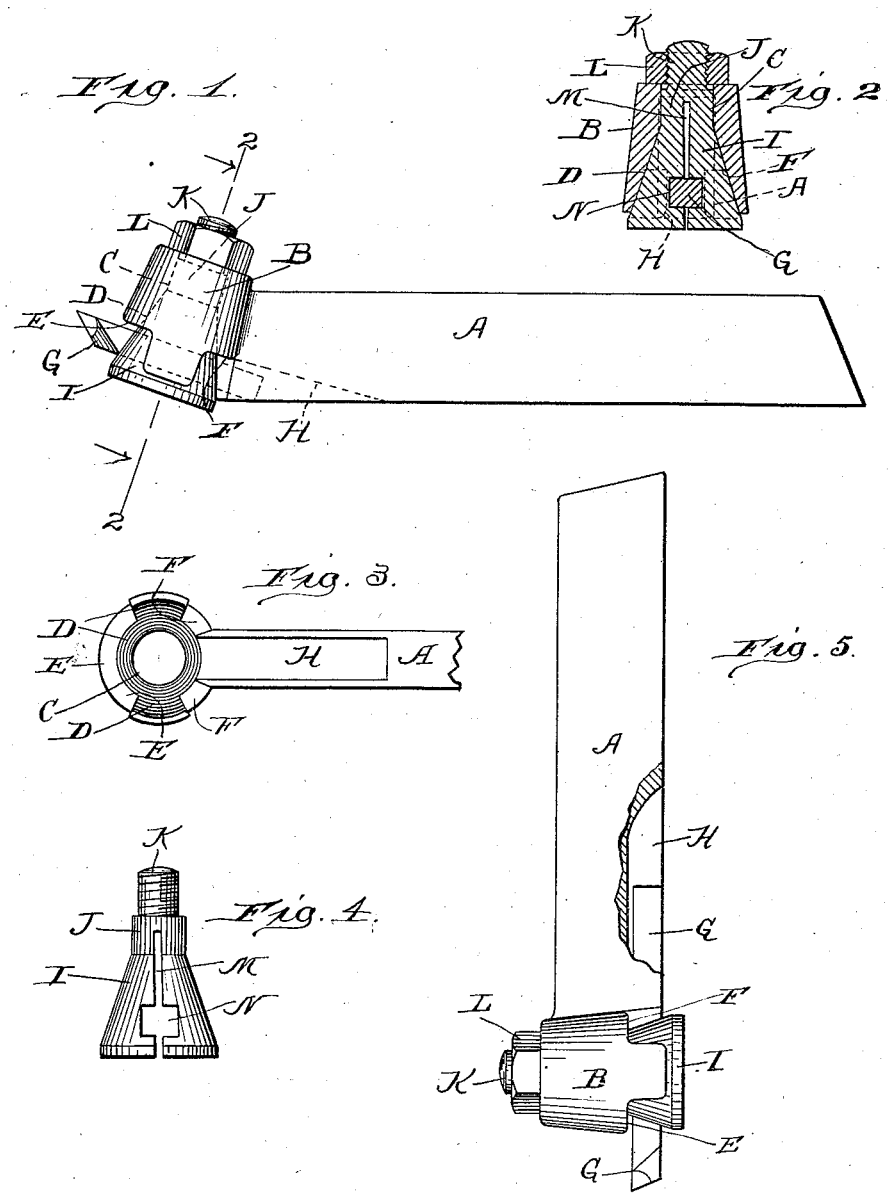

FRITZ SCHULZ, OF CHICAGO, ILLINOIS.

LATHE AND SHAPER TOOL.

No. 872,760.

Specification of Letters Patent.

Patented Dec. 3, 1907.

Application filed December 6, 1906. Serial No. 346,657.

*To all whom it may concern:*

Be it known that I, FRITZ SCHULZ, a citizen of the United States, residing at Chicago, in the county of Cook and State of Illinois, have invented certain new and useful Improvements in Lathe and Shaper Tools; and I do hereby declare the following to be a full, clear, and exact description of the invention, such as will enable others skilled in the art to which it appertains to make and use the same.

My invention relates to a novel construction in a lathe or planer tool, the object being to provide a device of this character which is adapted to the use of cutting tools made of a very high grade steel and which will serve to maintain said tool rigidly to the work and permit of great variation of adjustment thereof, and consists in the features of construction and combinations of parts hereinafter fully described and claimed.

In the accompanying drawings illustrating my invention: Figure 1 is a side elevation of a lathe tool constructed in accordance with my invention. Fig. 2 is a detail transverse section of the same, on the line 2—2 of Fig. 1. Fig. 3 is a fragmentary bottom plan view of the same, the tool head being removed. Fig. 4 is a front elevation of the tool head. Fig. 5 is a detail side elevation, partly in section, of a tool holder constructed in accordance with my invention, adapted for use in planers and shapers.

My said invention has for its particular object to provide means for clamping and adjusting the tool in such manner that the strain on the clamping means will be minimized, and further to so position the tool relatively to the stock and so arrange the clamping means as to insure the greatest relative rigidity of all parts, thereby preventing vibration or movement of the cutting edge of the tool relatively to the work and insuring accuracy.

My invention consists in the specific details of construction and relative arrangement of the constituent parts as hereinafter described and claimed.

My said invention comprises the stock A, at one end of which and integral therewith is a tapered sleeve B, the latter being disposed so that its axis is inclined to the stock A, as shown in Fig. 1, or so that the axis thereof is disposed perpendicularly to the stock, as shown in Fig. 5, to adapt the same for use in lathes and planers respectively. The said sleeve B is provided with a central opening C, tapered at its mouth portion, as at D, the said mouth portion being disposed in the lower end of said sleeve in the lathe tool and at the rear end thereof in the planer or shaper tool. The said mouth portion of said sleeve B is disposed flush with the lower or rear face of the stock A. At the mouth portion of said sleeve, diametrically opposite the point of juncture of the latter with the stock and at each side of the point of juncture with the latter, I provide segmental recesses E and F which are adapted to receive the cutter G and in which the latter is held against rotation relatively to said sleeve. Said cutter is likewise adapted to be received at one end in a longitudinal groove or recess H in the lower or rear face of the stock A, to maintain the same substantially parallel with the latter, the bottom of said recess H being flush with the bottoms of the recesses E and F.

The said cutter G is adapted to be securely clamped in the tool head I, the latter being conical and provided at its smaller end with a cylindrical shank J having a central threaded projection K adapted to pass through said central opening in said sleeve B and receive the nut L which is adapted to engage the upper or forward end of said sleeve to draw said head firmly within said sleeve. The said head I is split by means of the diametrical groove or recess M therein, terminating in said cylindrical shank and which is enlarged between its ends to provide the opening N in which said cutter G is adapted to be received. By drawing said head I into said tapered portion of said sleeve B, by means of said nut L, the said head will obviously be contracted and thus securely clamp said cutter G therein and at the same time said head will become firmly wedged within said sleeve and be thereby prevented from moving relatively to the latter in any direction. It is essential that the said cutter G should not rest upon the bottoms of said recesses E, F and H, for the reason that the strain thus imposed upon the latter tends to break or chip the walls thereof and rapidly destroys the tool. Furthermore, the clamping action of the head would be defeated by contact of the tool with the bottoms of said recesses, as will be obvious.

The width of the recesses E, F and H with relation to the width of the cutter G is such as to permit slight latitude of adjustment of the latter therein. The three principal positions of said cutter determined by the relative positions of said recesses are those generally rendered necessary for practically all classes of work. Where greater latitude of adjustment is required, the said recesses E, F and H may obviously be segmentally enlarged, to permit of greater scope in adjustment of the cutter.

In order that the clamping effect of the split head I may be most readily effected without imposing too great strain on the threaded projection K or nut L, it is essential that the contracting pressure on the head I should be applied as nearly to the free end thereof as possible to secure the greatest leverage and thus relieve the strain on the nut and on the walls of the tapered opening. By disposing the cutter G in alinement with the bearing surfaces engaging the tapered portion of the head I or, in other words, disposing the same in the plane of the projections bordering the segmental recesses the pressure on said cutter will be applied directly and positively and the possibility of the head yielding to strains on the cutter reduced to a minimum.

My said tool is very advantageous, by reason of the rigidity of the cutter maintained thereby and, further, by reason of the fact that the latter may be made of a very high quality of steel and waste of such steel minimized. A tool so made is very easily manipulated and is exceedingly durable, efficient and convenient.

I claim as my invention:

1. A device of the kind specified, comprising the stock enlarged at one end and provided in said end with a lateral opening tapered at one end, segmental recesses in the last-named end portion of said enlarged portion of said stock, a longitudinal groove in one face of the latter having its bottom disposed flush with the bottoms of said segmental recesses, a head tapered at one end and provided at its other end with a threaded shank adapted to enter said opening, said head being provided with a diametrical slot extending throughout the length of said tapered portion and enlarged between its ends to provide an opening to receive the tool, and a nut on said threaded shank engaging the other end of said enlarged portion of said stock to draw said tapered portion of said head into said tapered mouth of said opening and contract the same, said tool receiving opening being disposed below the outer end of said enlarged portion and the clamping pressure being exerted thereon in alinement with the said opening the said recesses being adapted to receive the tool and thus hold the head against rotation relatively to the stock.

2. A device of the kind specified, comprising a stock provided at one end with a lateral opening tapered at one end, a tapered head provided with a diametrical opening adapted to be received in said opening in said stock, a threaded shank on said head, a nut thereon adapted to engage one wall of said stock around said opening therein, said tapered portion of said head being split and adapted to be contracted when drawn into said opening, a cutter adapted to be received and clamped in said diametrical opening in said head, there being recesses in said stock around said opening to receive said cutter, the said recesses being of such depth as to prevent contact of said cutter with the bottom walls thereof when said head is drawn to its limit of movement within the said opening in said shank the said recesses being adapted to receive the tool and thus hold the head against rotation relatively to the stock.

In testimony whereof, I have signed my name in presence of two subscribing witnesses.

FRITZ SCHULZ.

Witnesses:
ARTHUR C. LOTZ,
RUDOLPH WM. LOTZ.